US010865581B2

United States Patent
Lancry et al.

(10) Patent No.: US 10,865,581 B2
(45) Date of Patent: Dec. 15, 2020

(54) AUTONOMOUS CLEANING SYSTEMS PRINCIPALLY FOR SWIMMING POOLS

(71) Applicant: Zodiac Pool Care Europe, Bron (FR)

(72) Inventors: Arnaud Lancry, Le Vernet d'Ariege (FR); Simon Duffaut, Castelginest (FR); Remi Deloche, Toulouse (FR); Louis Favie, Colomiers (FR); Philippe Pichon, Villeneuve de Riviere (FR)

(73) Assignee: ZODIAC POOL CARE EUROPE, Bron (FR)

( * ) Notice: Subject to any disclaimer, the term of this patent is extended or adjusted under 35 U.S.C. 154(b) by 0 days.

(21) Appl. No.: 16/540,641

(22) Filed: Aug. 14, 2019

(65) Prior Publication Data

US 2020/0056391 A1 Feb. 20, 2020

(30) Foreign Application Priority Data

Aug. 14, 2018 (FR) ...................... 18 57496

(51) Int. Cl.
*E04H 4/16* (2006.01)
*B01D 29/27* (2006.01)
*B25J 11/00* (2006.01)

(52) U.S. Cl.
CPC ........... *E04H 4/1654* (2013.01); *B01D 29/27* (2013.01); *B25J 11/0085* (2013.01); *A47L 2201/022* (2013.01)

(58) Field of Classification Search
CPC .... E04H 4/1654; B01D 29/27; B25J 11/0085; A47L 2201/022
USPC ........... 210/167.16, 167.17, 232, 238; 15/1.7
See application file for complete search history.

(56) References Cited

U.S. PATENT DOCUMENTS

| 2015/0101135 | A1* | 4/2015 | Witelson | G05D 1/0206 |
| | | | | 15/1.7 |
| 2015/0314453 | A1 | 11/2015 | Witelson et al. | |
| 2016/0289988 | A1* | 10/2016 | Maggeni | E04H 4/1654 |
| 2019/0202064 | A1* | 7/2019 | Wolff | B60L 53/14 |
| 2019/0265718 | A1* | 8/2019 | Lee | B25J 13/086 |
| 2019/0284827 | A1* | 9/2019 | Witelson | H02J 50/10 |
| 2020/0001723 | A1* | 1/2020 | Durvasula | E04H 4/1654 |

FOREIGN PATENT DOCUMENTS

| EP | 2669450 | 12/2013 |
| WO | 2016026059 | 2/2016 |
| WO | 2019209429 | 10/2019 |

OTHER PUBLICATIONS

Machine-generated English translation of WO2016/026059A1, generated on Jul. 13, 2020.*
International Application No. PCT/IB2019/056914, International Search Report and Written Opinion dated Jan. 2, 2020, 14 pages.

* cited by examiner

*Primary Examiner* — Fred Prince
(74) *Attorney, Agent, or Firm* — Kilpatrick Townsend & Stockton LLP; Dean W. Russell (57) ABSTRACT

Swimming pool cleaners may operate autonomously within pools and spas. The cleaners need not include any external hoses or cords, and their bodies may be oriented at pool waterlines so as to make their on-board filters readily accessible for removal. The cleaners may dock at docking stations for various purposes, including (but not limited to) for charging any on-board battery and communicating electronically with the docking station or other external equipment.

22 Claims, 10 Drawing Sheets

AUTONOMOUS CLEANING SYSTEMS PRINCIPALLY FOR SWIMMING POOLS

CROSS-REFERENCE TO RELATED APPLICATION

This application claims priority to French Patent Application No. 18 57496, filed Aug. 14, 2018, and entitled "Robot Nettoyeur de Bassin Autonome," the entire contents of which application are incorporated herein by this reference.

FIELD OF THE INVENTION

The present invention relates to systems, methods, and apparatus for cleaning liquid-containing vessels such as swimming pools and spas and more particularly, although not necessarily exclusively, to automatic swimming pool cleaners (APCs) configured to travel within swimming pools while removing debris from water thereof.

BACKGROUND OF THE INVENTION

APCs generally are well known. These cleaners often are categorized as either "hydraulic" or "robotic" (or "electric"), depending on the source of their motive power. Hydraulic cleaners, for example, typically use pressurized (or depressurized) water to effect their movement within pools, whereas robotic cleaners typically utilize an electric motor to cause their movement. Moreover, hydraulic cleaners frequently are subcategorized as either "pressure-side" or "suction-side" devices, with pressure-side cleaners receiving pressurized water output from an associated water-circulation pump and suction-side cleaners, by contrast, being connected to an inlet of the pump.

Fluid-conveying hoses connect hydraulic cleaners with the water-circulation pumps. These hoses necessarily extend into the water of swimming pools and move about the pools as do the cleaners to which they are connected. The hoses often are considered to be unsightly and, at times, may present obstacles to swimmers or impede manual debris removal from pools.

Robotic cleaners typically lack any such fluid-conveying hoses. However, because a reliable source of electricity is required to operate these types of cleaners, robotic APCs often include electrical cables connected directly or indirectly to their drive motors. Like fluid-conveying hoses, the electrical cables may be unsightly and obstruct or impede certain pool-related activities.

Debris evacuated from pools using suction-side hydraulic cleaners normally travels through the fluid-conveying hoses to filters remote from the cleaners. Consequently, many suction-side cleaners do not necessarily need to be removed from swimming pools to discard the filtered debris. By contrast, most pressure-side hydraulic cleaners, as well as conventional robotic cleaners, contain filters within or carried by the bodies of the cleaners. In general, therefore, these types of APCs must be removed from pools in order to access their filters and empty the filters of debris. Removal of an APC from a pool is not always an easy task, however; withdrawing filters from wet bodies of APCs for emptying additionally disadvantageously exposes pool owners to water and debris.

U.S. Patent Application Publication No. 2006/0169322 of Torkelson discloses an early attempt at creating a docking system for a suction-side APC so as to conceal its fluid-conveying hose when the APC is not operating. The system utilizes a housing "preferably installed in the side of [a] swimming pool . . . at the time of pool construction," see Torkelson, p. 6, ¶0079, as well as "a long storage tube" in which the fluid-conveying hose may be stored. A hydraulically-powered control assembly within the floor of the housing is employed to deploy and retract the hose. See id., p. 8, ¶¶0095, 0097.

U.S. Patent Application Publication No. 2014/0263087 of Renaud, et al., describes another docking system for use with APCs. The system includes a docking station for a robotic cleaner positioned at an edge of a swimming pool "such that a bottom end of the docking station extends into the water of the swimming pool and a top end extends above the water of the swimming pool." See Renaud, p. 3, ¶0026 (numerals omitted). The docking station may contain means for communicating with the APC and an electric cable for recharging a battery within the APC. The electric cable apparently remains attached to the APC during its use, as a hose swivel is deployed "to prevent tangling of the electric cable as the cleaner travels along the walls, floor and/or water line of the swimming pool." See id., ¶0028.

According to the Renaud application, the docking system additionally automatically empties debris from the APC into a collection chamber of the docking station. See id., p. 4, ¶0033. No explanation for how this emptying occurs is provided in the Renaud application. Likewise unexplained is how the collection chamber of the docking station itself is emptied.

SUMMARY OF THE INVENTION

The present invention seeks to provide cleaning systems in which on-board filters of APCs may be removed easily for cleaning. Such easy removal, furthermore, may occur while a cleaner remains in a pool. Particularly beneficial is that the cleaner may present itself at the pool waterline in a manner allowing its filter to be grasped readily by someone positioned on a deck surrounding the pool.

Also advantageous is that APCs of the present invention may lack entirely any hoses or electrical cords. Instead, the cleaners may utilize solely one or more on-board batteries for electrical power. Accordingly, the APCs need not be tethered in any way while in use, and no hoses or cords need obstruct or impede activities performed within the pool.

Versions of the invention may include a docking station which an APC may engage. Such a docking station may, for example, allow recharging of the on-board batteries. It also may orient a cleaner body so that a handle of the filter of the cleaner is readily accessible for grasping. Like the docking station of the Renaud application, that of the invention may comprise a mechanism for communicating electronically with an APC at least while docked, if not also while operating within the pool. As but one example, the docking station may transmit a signal to a cleaner instructing the cleaner to approach the docking station for docking. Alternatively or additionally, the docking station may transmit a homing beacon allowing the APC to guide itself thereto.

Docking stations may be located in any suitable places in, on, or about swimming pools. In some instances, a docking station may attach, temporarily or permanently, to a deck of a pool. In other cases, a docking station could connect to a skimmer of a pool or form part of a trolley. Also envisioned are situations in which a docking station is located in a wall niche or otherwise wholly below a deck of a pool.

Systems of the invention hence may admit autonomous operation of cleaners within swimming pools, free of any external hoses, cords, or other tethers or restrictions. The cleaners may be pre-programmed if desired to control their actions and maneuvers within pools or signaled electronically to effect such control. Electronic communication certainly may occur when an APC is docked at a docking station. It conceivably also may occur wirelessly when the APC travels within an area proximate the docking station.

Either the cleaner or the docking station (or both) may sense or measure characteristics of the pool or of the water contained therein. Information relating to the characteristics may be passed between the cleaner and the docking station. In some embodiments of the invention, the docking station may forward any or all of the information elsewhere, in any suitable wireless or wired manner.

It thus is an optional, non-exclusive object of the present invention to provide swimming pool cleaners that may function without external hoses or cords.

It is another optional, non-exclusive object of the present invention to provide systems permitting untethered operation of APCs within pools.

It is also an optional, non-exclusive object of the present invention to provide cleaners capable of orienting their bodies at pool waterlines so as to present debris filters in manners facilitating their removal from the bodies.

It is, moreover, an optional, non-exclusive object of the present invention to provide pool-cleaning systems including docking stations which APCs may engage.

It is a further optional, non-exclusive object of the present invention to provide systems in which pool cleaners may communicate electronically with the docking stations or other external devices.

Other objects, features, and advantages of the present invention will be apparent to persons skilled in the relevant field with reference to the remaining text and the drawings of this application.

DETAILED DESCRIPTION

Figure 1:
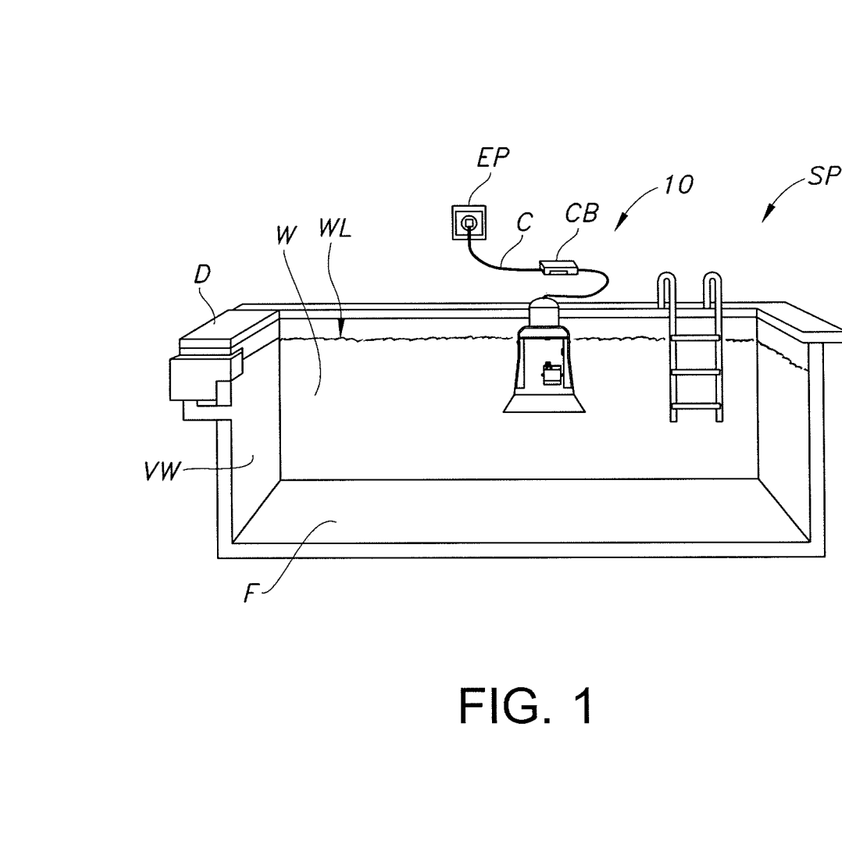
FIG. 1 is an elevational, cut-away, partially schematicized illustration of a swimming pool in which components of a cleaning system of the present invention may operate.

Depicted in FIG. 1 is swimming pool SP. As is conventional, pool SP may be filled with water W to a waterline WL and surrounded by a rim, coping, or deck D. Pool SP further may include bottom or floor F as well as one or more generally vertically-oriented walls VW.

Figure 2:
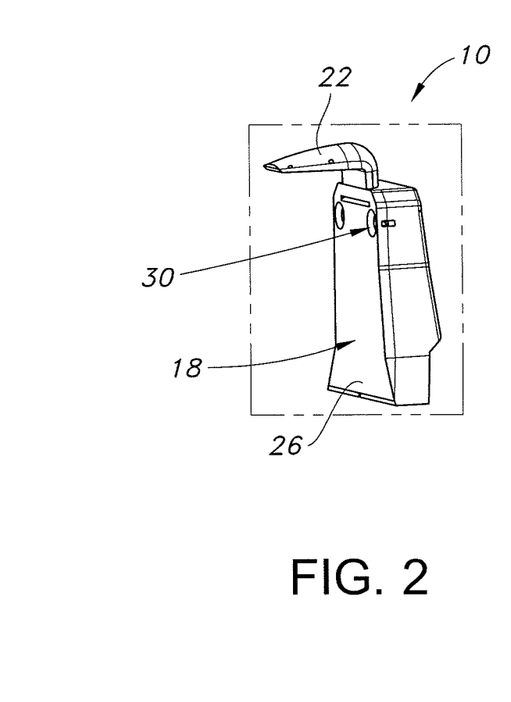
FIG. 2 is a conceptual illustration of an exemplary base or docking station which may be a component of the cleaning system of FIG. 1.

Also shown in FIG. 1 is an exemplary base 10. Base 10 may function as a docking station for an APC such as (but not limited to) cleaner 14 of FIG. 3. As illustrated in FIGS. 1-2, base 10 may be shaped in the form of the letter "L" with a generally vertical component 18 and a generally horizontal component 22. Component 18 normally is configured to attach to deck D in any appropriate manner externally of water W, whereas at least part of component 22 preferably is positioned within pool SP below waterline WL. If desired, component 22 may include a generally planar rear face 26 for placement in contact with, or adjacent to, a wall VW. FIG. 2 additionally illustrates suction cups 30 protruding from rear face 26 in contact with the wall VW to help stabilize the position of base 10. Persons skilled in the art will, however, recognize that rear face 26 need not necessarily be planar and that suction cups 30 are optional, as other means of locating base 10 relative to pool SP may be employed.

FIG. 1 illustrates base 10 being connected to a source of electrical power EP (such as, but not limited to, electrical mains). Such connection may occur via one or more electrical cords C so as to power electronics and other equipment of base 10. Notably, any such electrical cords C may be located completely externally of pool SP, as the present invention preferably avoids any need for an electrical cord to be positioned in water W. Alternatively, base 10 may include solar cells 34 (see FIG. 12), batteries, or other features designed to supply electrical power without connection to electrical mains and without using any electrical cords C.

Further depicted in FIG. 1 is optional control box CB electrically connected to base 10. If present, control box CB may be configured at least to receive wireless transmissions and convey signals to base 10. Of course, functionality of control box CB alternatively may be incorporated into base 10 itself.

Figure 3:
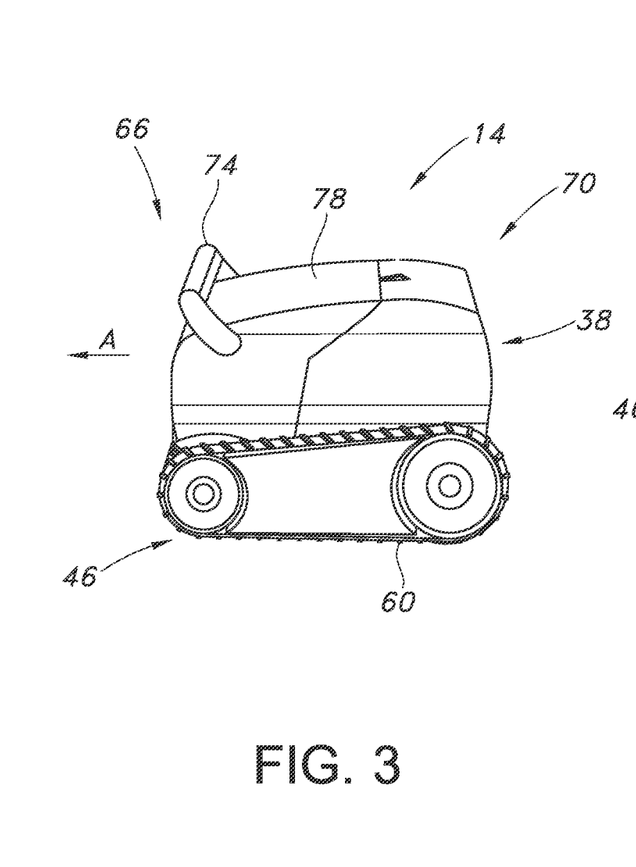
FIG. 3 is a perspective view of an exemplary APC which likewise may be a component of the cleaning system of FIG. 1.
Figure 4:
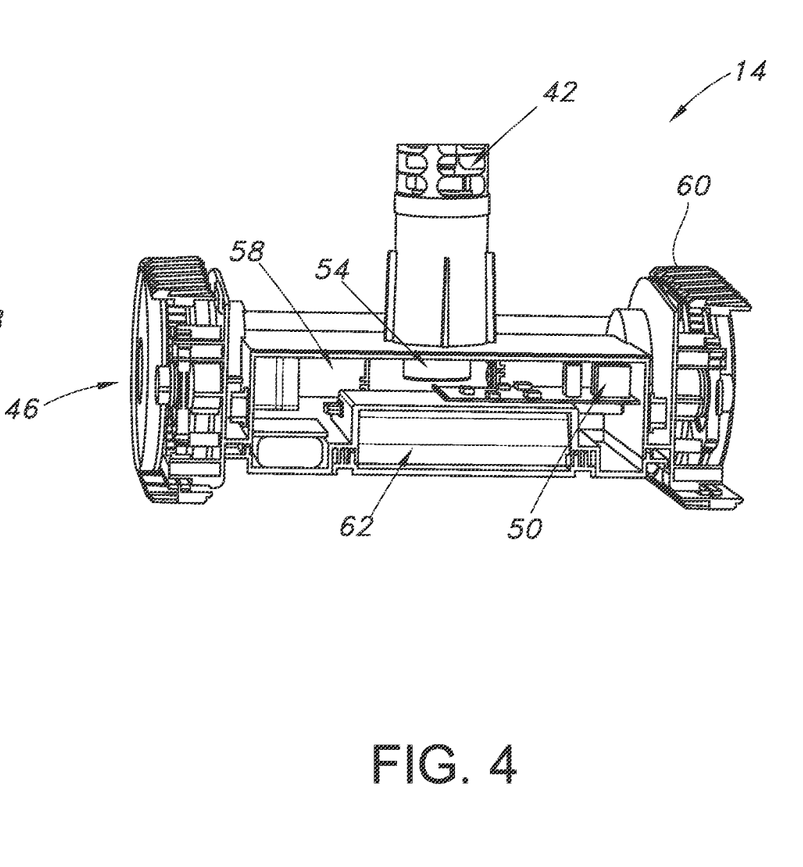
FIG. 4 is an elevational, cut-away illustration of the APC of FIG. 3.

FIGS. 3-4 illustrate an exemplary cleaner 14. Cleaner 14 preferably is a robotic cleaner, although a suitably-outfitted hydraulic cleaner may be utilized instead. Like other robotic cleaners, cleaner 14 may include body 38, pump 42, motive means 46, and electronics 50. The depicted version of cleaner 14 includes first and second electric motors 54 and 58, with the first motor 54 driving pump 42 and the second motor 58 driving motive means 46. More or fewer motors may, of course, be used instead. Although FIGS. 3-4 depict tracks 60 as part of motive means 46, wheels, brushes 61 (see FIGS. 5A-B) or other equipment for moving cleaner 14 along a surface such as floor F or walls VW may be used additionally or instead.

Shown in FIG. 4 within body 38 is at least one battery 62. Battery 62 may be used to power electric motors of cleaner 14, such as first and second motors 54 and 58. Battery 62 also may power electronics 50, which typically include at least one or more computer processors or controllers. Accordingly, cleaner 14 may operate within water W of pool SP without any need for a cord or hose extending externally of body 38. Battery 62 advantageously is rechargeable (via induction or otherwise) at least when cleaner 14 is docked at base 10.

Arrow A of FIG. 3 identifies a nominal forward direction of travel of cleaner 14. Region 66, consequently, may be deemed a front of cleaner 14, whereas region 70 may be considered the back of the cleaner 14. Present in region 66 may be handle 74 of debris filter 78, which may form part of, or be included in, body 38. Filter 78 is designed to retain debris vacuumed by cleaner 14 from water W.

Figure 5A:
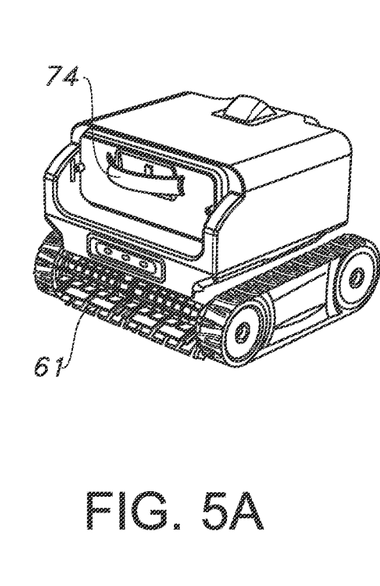
FIGS. 5A-B are perspective views of another exemplary APC illustrating removal of an on-board debris filter.
Figure 5B:
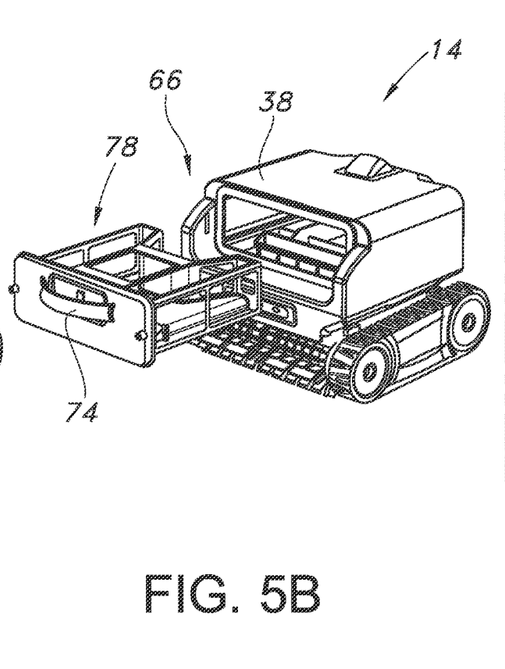
Figure 5C:
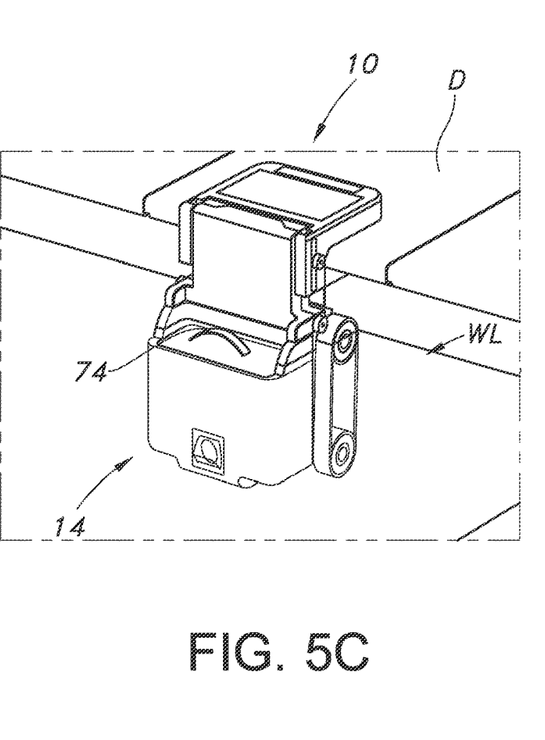
FIG. 5C depicts the APC of FIGS. 5A-B docked at a docking station which may be a component of the cleaning system of FIG. 1.

As illustrated particularly in FIGS. 5A-B in connection with a similar cleaner 14, filter 78 may be configured to be removable from body 38 merely by grasping and pulling handle 74. Filter 78 likewise may be returned to body 38 by grasping handle 74 and sliding (pushing) the filter 78 into the body 38. Hence, if cleaner 14 engages base 10 as shown in FIG. 5C, handle 74 is presented as an uppermost part of body 38 above waterline WL notwithstanding that the majority of cleaner 10 may remain below waterline WL. With cleaner 10 in this position a human may easily reach down, grasp handle 74, and withdraw filter 78 from body 38 without entering pool SP himself or removing cleaner 14 from pool SP.

In this way, filter 78 may be emptied and cleaned without any need for cleaner 14 to exit the pool SP. And as no hose or cord need be attached to its body 38, cleaner 14 may remain within pool SP as long as desired and operate autonomously, without tether, as needed. Stated differently, via its construction and capability of engaging with base 10, cleaner 14 may move within and vacuum pool SP, communicate with other devices, and have its debris filter 78 emptied without cleaner 14 ever exiting pool SP or being connected to an external hose or cord.

Figure 6:
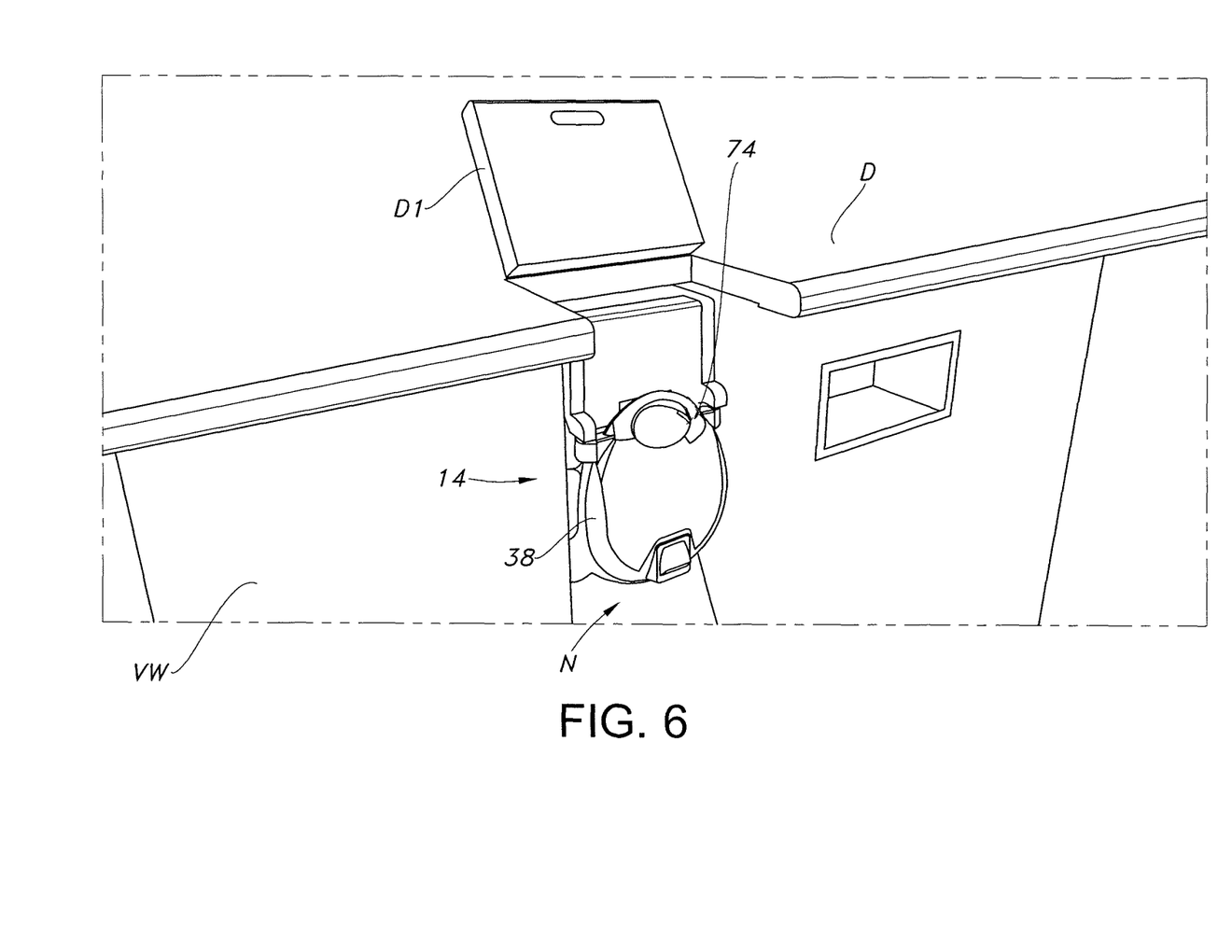
FIGS. 6-7 and 8A-B are perspective, conceptual views of an alternate placement of a docking station which may be a component of the cleaning system of FIG. 1.
Figure 7:
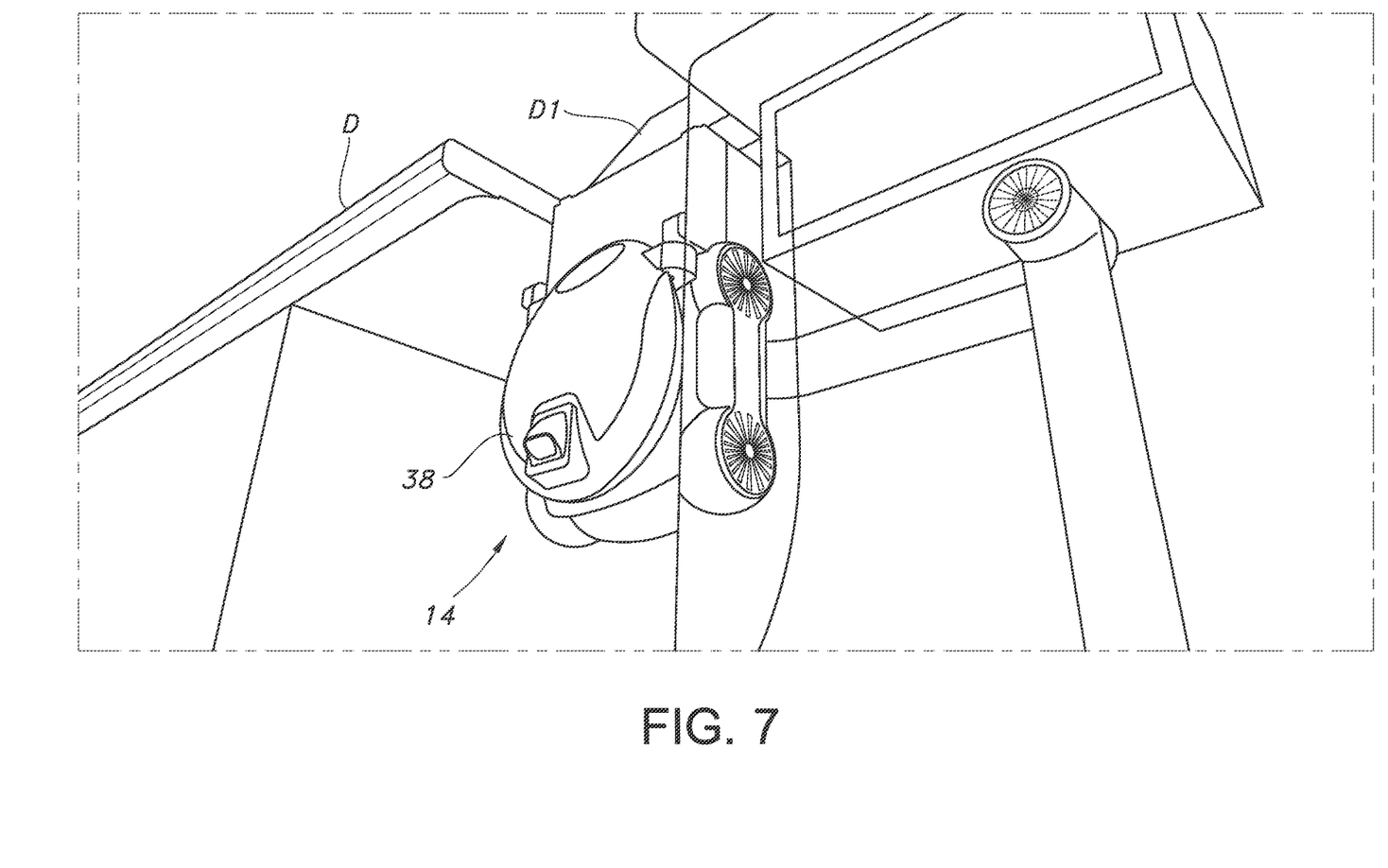

Although FIG. 1 depicts component 22 of base 10 as positioned on deck D, base 10 need not necessarily be so positioned. FIGS. 6-7, for example, show a base 10 located wholly below deck D, perhaps in a niche N of a wall VW. Cleaner 14 nevertheless may continue to engage base 10 as described earlier herein, continuing to present handle 74 above waterline WL as an uppermost part of body 38. Contemplated in FIGS. 6-7 is that deck D include a moveable section D1 facilitating access to handle 74. Section D1 may be hinged or configured for movement in any suitable manner. Alternatively, section D1 may be removed from deck D. Yet alternatively, no moveable section D1 need necessarily be present in deck D.

Figure 8A:
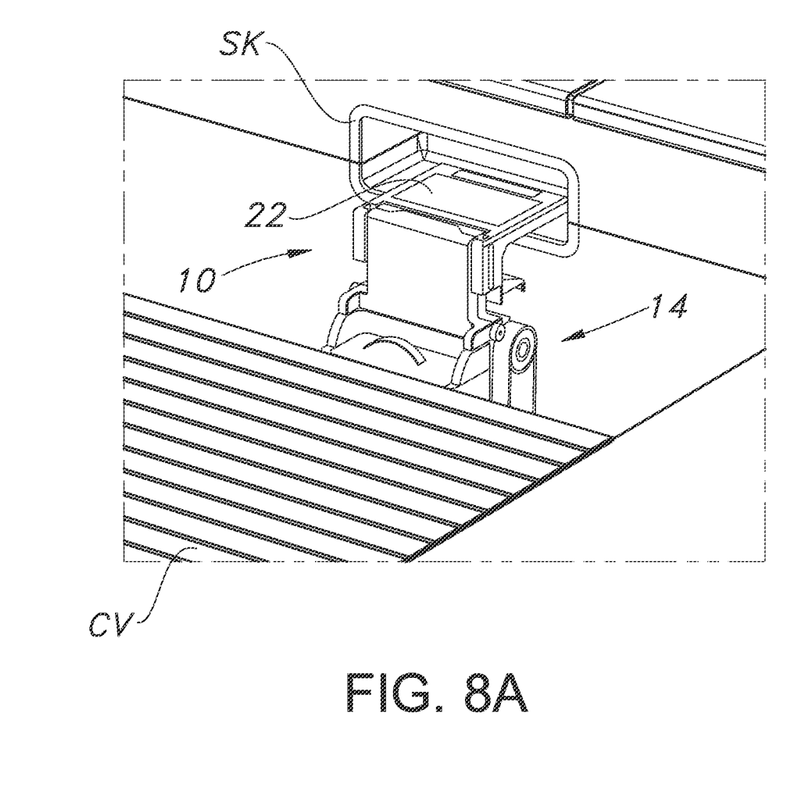
Figure 8B:
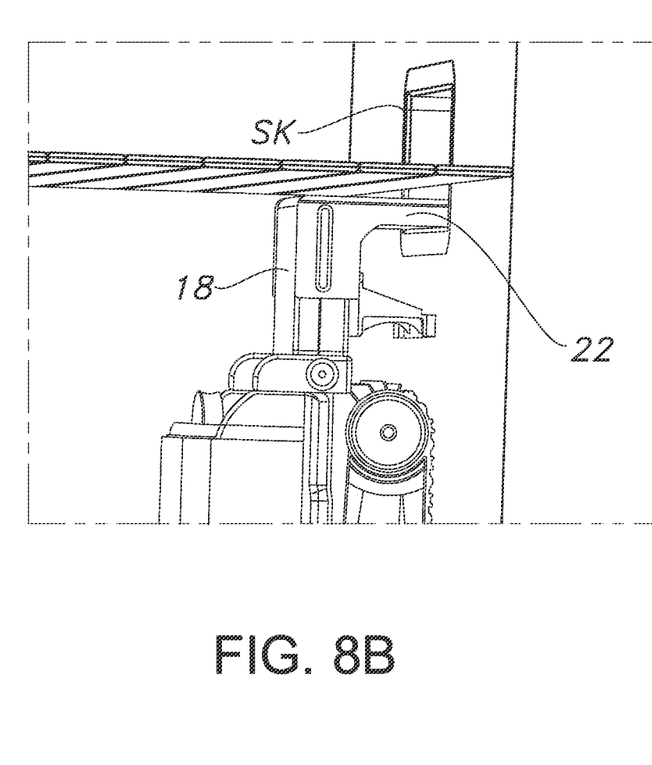

FIGS. 8A-B illustrate another alternate placement of a base 10. In this instance base 10 is shown as having component 22 positioned within or on a skimmer SK of the pool SP. In this manner, base 10 may be located wholly below a cover CV used to cover pool SP. Persons skilled in the art understand that base 10 may be designed to accommodate such covers CV without necessarily being connected to skimmers SK, however.

Beneficially, base 10 is capable of transmitting and receiving radio frequency (RF) or other electronic signals wirelessly or via wire. Base 10 may provide instructions, information, and data to electronics 50 of cleaner 14, either when cleaner 14 is docked or otherwise. Likewise, base 10 may receive instructions, information, and data from cleaner 14, again when cleaner 14 is docked or otherwise.

Base 10 additionally may communicate with control box CB of FIG. 1 if present. Alternatively or additionally, base 10 may communicate with other devices, including devices remote from pool SP. This communication may be direct or indirect, through a local-area network or wide-area network, via the Internet, or otherwise. Devices with which base 10 may communicate may include hand-held apparatus such as, but not limited to, smartphones, as well as other portable or non-portable devices. Bluetooth, Wi-Fi, or other communications protocols may be employed if desired.

Figure 9:
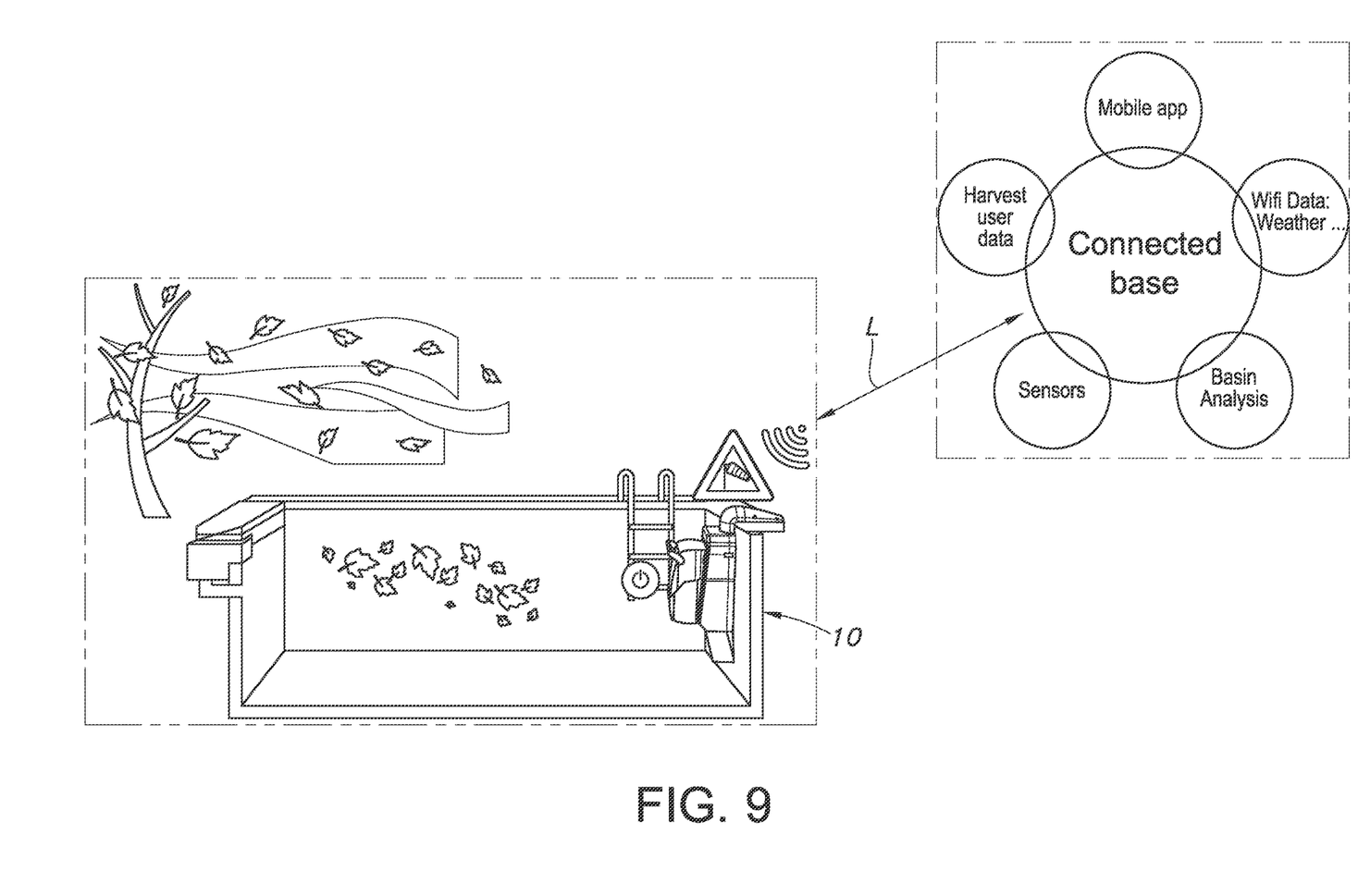
FIG. 9 is a concept illustration of certain possible features of a docking station which may be a component of the cleaning system of FIG. 1.
Figure 10A:
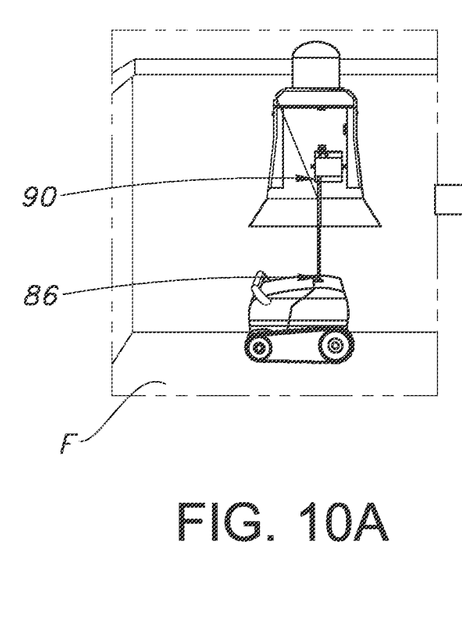
FIGS. 10A-D illustrate an exemplary approach of the present invention for guiding an APC to a docking station of the present invention.
Figure 10B:
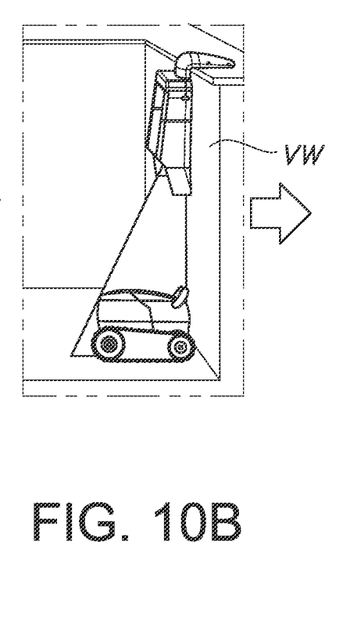
Figure 10C:
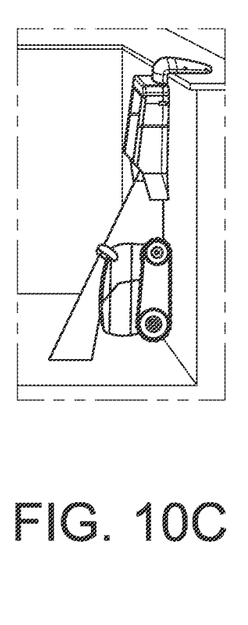
Figure 10D:
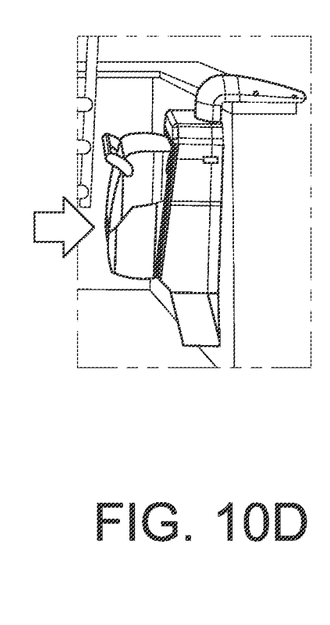

FIG. 9 conceptually illustrates certain communication options for base 10. Sensors present either in base 10 or cleaner 14 (or in both) may supply information concerning, e.g., the pool SP, characteristics of water W within pool SP, or the status of base 10 and cleaner 14 themselves. Base 10 may convey any or all of this information via wired or wireless communication link L for further processing, evaluation, assessment, storage, or otherwise. As but one example, a sensor of cleaner 14 (or base 10) may identify when filter 78 needs emptying; this information may be conveyed to base 10 and thence to a smartphone or other device of the pool owner (or of a pool maintenance professional) for action. Alternatively or additionally, cleaner 14 or base 10 may illuminate a light or provide some other sort of visual, aural, or tactile indication, etc., that an event has occurred or status condition is achieved. In some versions of the invention, base 10 may incorporate a camera trained at water W for sensing clarity or other aspects of the water W.

Figure 12:
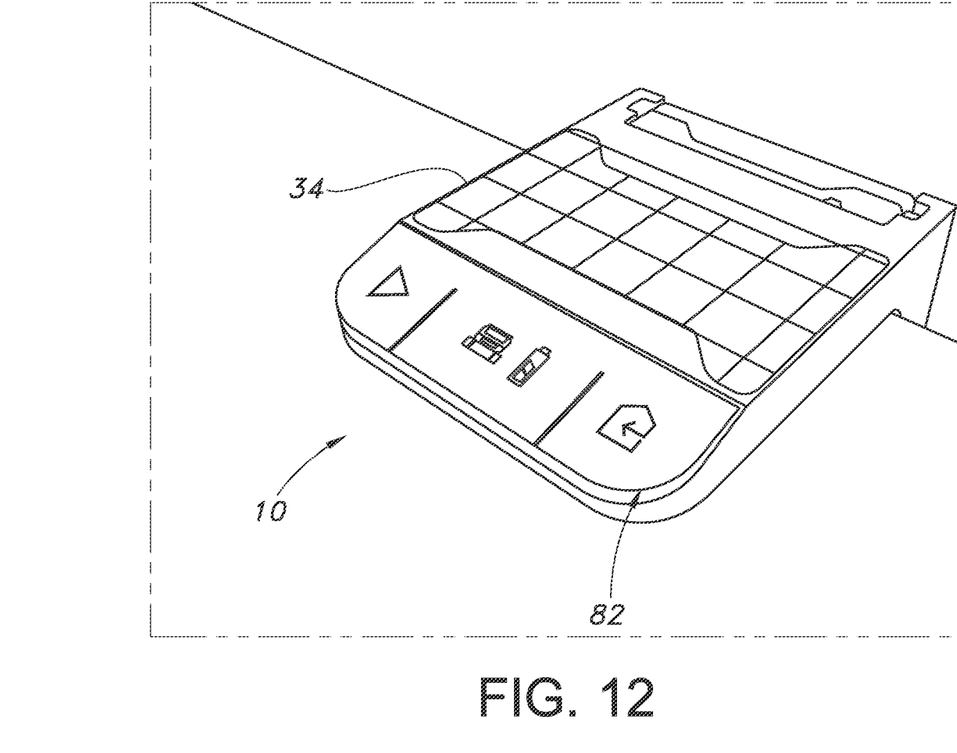
FIG. 12 is a perspective view of an exemplary docking station including, for example, solar cells for power generation.

Included as inventive concepts herein are methods of guiding cleaner 14 to base 10. Electronics 50 of cleaner 14 may, for example, be programmed to seek base 10 after a designated time period has elapsed, a sensor indicates filter 78 is full, a sensor indicates pool SP contains swimmers, or otherwise. An interrupt-type signal received by an operating cleaner 14 similarly could cause the cleaner 14 to seek base 10. FIG. 12 illustrates an exemplary "come home" button 82 on component 22 of base 10 which may be depressed by a human to cause base 10 to issue such an interrupt-type signal.

In FIGS. 10A-D, cleaner 14 is shown as containing an optical sensor 86, and base 10 includes a laser or other light source 90. Assuming any other return conditions are satisfied, when optical sensor 86 detects light source 90, electronics 50 recognize that base 10 has been detected and is nearby (see FIG. 10A). Programming of cleaner 14 may then cause the cleaner 14 to rotate from floor F to wall VW (see FIG. 10B) and climb the wall VW in the forward direction in order to approach and align with base 10 (see FIG. 10C). Thereafter cleaner 14 may engage base 10 (see FIG. 10D) for docking. If the perimeter of pool SP has been mapped, cleaner 14 may already understand the approximate location of base 10, so the final alignment and docking may be able to occur relatively quickly.

In some embodiments of these systems, magnets may be used—both in base 10 and in cleaner 14—to retain cleaner 14 in place upon docking with base 10. A motor or other suitable mechanism conceivably could be employed in either base 10 or cleaner 14 to turn, or otherwise change the polarity of, its associated magnets so that the magnets either are attracted to or are repelled by the corresponding magnets of the other component. Attractive magnet will allow cleaner 14 to dock with base 10, whereas causing the magnet to repel will decouple cleaner 14 from dock 10.

Figure 11A:
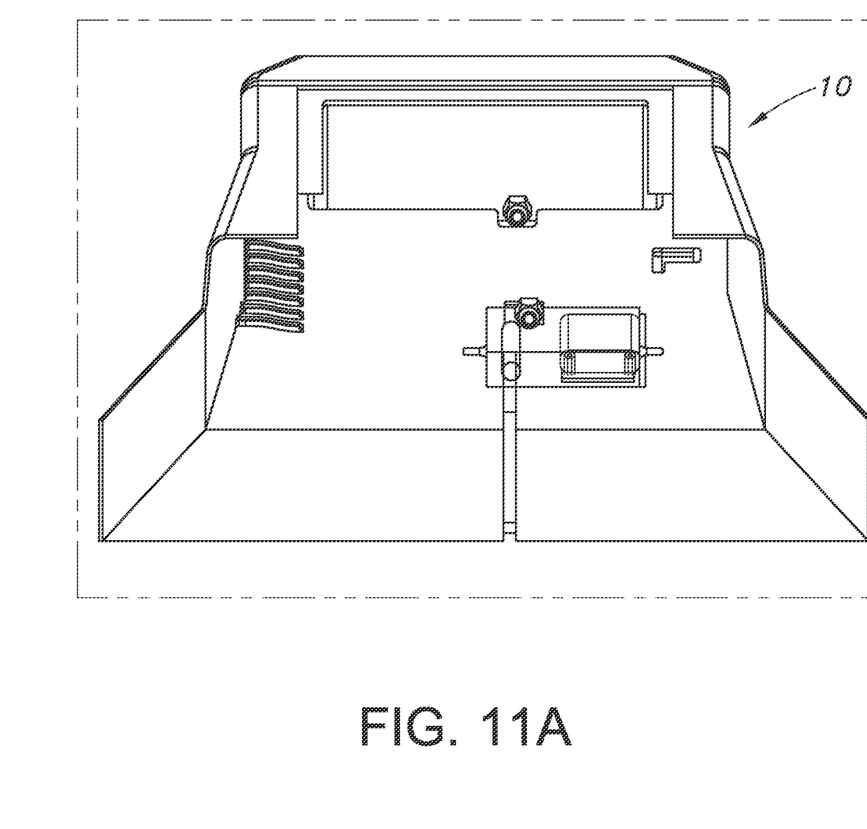
FIGS. 11A-B depict exemplary equipment of a docking system useful for docking an APC of the present invention.
Figure 11B:
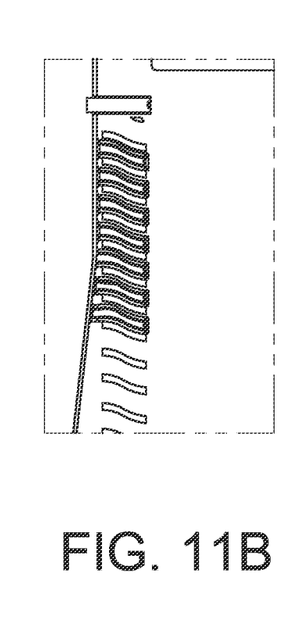

In other embodiments, electrical, mechanical, or electromechanical latching or locking mechanisms may be used. FIGS. 11A-B illustrate one of many possibilities for inter-engaging cleaner 14 and base 10 for docking in which protrusions of tracks 60 fit into corresponding notches of base 10. In any event, cleaner 14 may be fixed into position relative to base 10.

Aspects of the present invention are not intended to be mutually exclusive, exhaustive, or restrictive in any way, and the invention is not limited to these example embodiments but rather encompasses all possible modifications and variations within the scope of any claims ultimately issued in connection with the invention (and their equivalents). For avoidance of doubt, any combination of features not physically impossible or expressly identified as non-combinable herein may be within the scope of the invention.

The entire contents of the Torkelson and Renaud applications are incorporated herein by this reference. Further, although applicant has described systems for use in cleaning swimming pools, persons skilled in the relevant field will recognize that the present invention conceivably may be employed in other manners as well. Finally, references to "pools" and "swimming pools" herein may also refer to spas or other water containing vessels used for recreation or therapy and for which cleaning is needed or desired.

What is claimed is:

1. A swimming pool cleaning system comprising:
   a. a base configured for attachment to a swimming pool having a waterline; and
   b. a cleaner (i) comprising (A) a body lacking any external electrical cord, (B) motive means configured to cause the body to travel untethered within the swimming pool, and (C) a debris filter and (ii) configured to dock with the base so that (A) at least a portion of the debris filter extends above the waterline and (B) at least a portion of the body extends below the waterline.

2. A swimming pool cleaning system according to claim 1 in which the debris filter comprises a handle extending above the waterline when the cleaner is docked with the base.

3. A swimming pool cleaning system according to claim 1 in which the cleaner further comprises an on-board power supply.

4. A swimming pool cleaning system according to claim 3 in which the cleaner also lacks any external fluid-conveying hose.

5. A swimming pool. cleaning system according to claim 3 in which the on-board power supply comprises a rechargeable battery.

6. A swimming pool cleaning system according to claim 5 in which the base is configured to recharge the rechargeable battery when the cleaner is docked.

7. A swimming pool cleaning system according to claim 1 in which the base comprises means for supplying a homing beacon and the cleaner further comprises a detector for detecting the homing beacon.

8. A swimming pool cleaning system according to claim 1 in which the base is configured for attachment to at least one of a deck of the swimming pool, a skimmer of the swimming pool, or a wall of the swimming pool.

9. A swimming pool cleaning system. according to claim 8 in which the base is configured for removable attachment to at least one of the deck, the skimmer, or the wall.

10. An auto swimming pool cleaner defining a front region, configured to dock with a base attached to a swimming pool and comprising:
   a. a body lacking any external electrical cord:
   b. an electric motor:
   c. motive means ,driven by the electric motor and (ii) configured cause the body to travel untethered within the swimming pool; and
   d. a filter (i) configured to be positioned at least partially in the body, (ii) comprising a handle located in the front region, and (iii) removable from the body by grasping and pulling the handle at least when the automatic swimming pool cleaner is docked with the base.

11. An automatic swimming pool cleaner according to claim 10, further comprising a source of electricity at least partially within the body for supplying electricity to the electric motor.

12. An automatic swimming pool cleaner according to claim 11 in which the source of electricity is a rechargeable battery.

13. An automatic swimming pool cleaner according to claim 12 in which the motive means comprises a track.

14. An automatic swimming pool cleaner according to claim 13 in which the track comprises protrusions configured to fit into notches of the base.

15. A method of cleaning a swimming pool having a floor, a and a waterline, comprising:
   a. causing an automatic swimming pool cleaner to travel untethered along the floor while vacuuming debris into an on-board filter; and
   b. causing the automatic swimming pool cleaner to climb the wall and dock with a docking station in an orientation such that at least part of the on-board filter is above the waterline and at least part of a body of the automatic swimming pool cleaner is below the waterline.

16. A method of cleaning a swimming pool according to claim 15 further comprising removing the on-board filter from the automatic swimming pool cleaner.

17. A method of cleaning a swimming pool according to claim 16 further comprising cleaning the filter and reinserting the filter into the automatic swimming pool cleaner.

18. A method of cleaning a swimming pool according to claim 17 further comprising causing the automatic swimming pool cleaner to disengage from the docking station.

19. A method of cleaning a swimming pool according to claim 18 in which (i) each of the automatic swimming pool cleaner and the docking station comprises a magnet and (ii) the act of causing the automatic swimming pool cleaner to disengage from the docking station comprises causing a change of polarity of either the magnet of the automatic swimming pool cleaner or the magnet of the docking station so as to repel the other magnet.

20. A method of cleaning a swimming pool according to claim 15 in which each of the automatic swimming pool cleaner and the docking station comprises a magnet.

21. A method of cleaning a swimming pool according to claim 20 in which the magnet of the automatic swimming pool cleaner engages the magnet of the docking station in an attractive manner to dock the automatic swimming pool cleaner with the docking station.

22. A system for cleaning a swimming pool having a waterline, comprising:
   a. a trolley comprising a base; and
   b. a cleaner (i) comprising a body lacking any external electrical cord, motive means configured to cause the body to travel untethered within the swimming pool, and a debris filter and (ii) configured to dock with the base so that (A) at least a portion of the debris filter extends above the waterline and (B) at least a portion of the body extends below the waterline.

* * * * *